April 19, 1966 R. WALSER ETAL 3,246,401
ROTARY DRYING DRUM
Filed Dec. 10, 1963 10 Sheets-Sheet 10

3,246,401
ROTARY DRYING DRUM
Rudolph Walser, Milford, William O. Davis, New Canaan, and Steve L. Kaczeus, Milford, Conn., assignors to Huyck Corporation, Rensselaer, N.Y., a corporation of New York
Filed Dec. 10, 1963, Ser. No. 329,431
12 Claims. (Cl. 34—122)

The present invention relates to the drying of porous materials and more particularly to dehydrating newly formed paper.

The newly formed paper web withdrawn from a Fourdrinier or other paper-making machine contains a high percentage of moisture which must be removed. Typically, the moisture may represent 80% or more of the newly formed paper web. It has been customary to reduce the moisture content of a newly formed paper web, for example, to 60%, by passing the web between a series of press rolls. The partially dehydrated web is then passed over a series of steam heated dryer rolls or cans. Typically, as many as 20 to 140 dryer rolls may be used before the paper stock is dried sufficiently to be subjected to its final calendering.

The large number of dryer rolls commonly used have presented numerous problems with respect to space, maintenance, operation and investment. However, efforts to cut down the number of rolls for any given application have met with only limited success.

The principal object of the present invention has been the provision of novel and improved apparatus for drying a paper web.

More particularly, it has been an object of the invention to provide such an apparatus which may be used to replace all or any desired number of the dryer rolls customarily used to dry the output of a paper making machine.

Another object of the invention has been the provision of such apparatus which is economical to manufacture and economical to use, especially as regards the energy requirements relative to moisture reduction.

A feature of the invention has been the provision of such apparatus which is readily adjustable to accommodate paper webs of different width.

Still another object of the invention has been the provision of such apparatus which avoids marking the paper web or otherwise damaging the paper web.

Yet another object of the invention has been the provision of such apparatus which improves paper quality, especially as regards dimensional stability.

Other and further objects, features and advantages of the invention will appear more fully from the following description of the invention taken in connection with the appended drawings, in which:

Referring now to the drawings, the illustrative embodiment of the dryer of the invention therein shown comprises a rotatable assembly generally designated by the reference numeral 20 and a stationary assembly generally designated by the reference numeral 21.

The rotatable assembly 20 comprises a circular disk 22 adjacent one end of the dryer, a similar disk 23 adjacent the other end of the dryer, a hollow metal open faced or honeycomb cylinder 24, a perforated metal cylinder 25, and a porous cylinder 26.

The cylinder 24 is carried in annular notches 27 and 28 provided on the inside peripheral edges of the disks 22 and 23, respectively. Typically, the cylinder 24 might be 92" long and have an outside diameter of 48" and a wall thickness of about 2.0". With such dimensions, the cylinder 24 will be heavy and, since disks 22 and 23 provide the whole support for the cylinder 24, the disks 22 and 23 should be strongly constructed. Typically, these disks might be made from 1" hot rolled steel stock or 304 stainless steel. As shown, the disks 22 and 23 are each provided with a number of radially extending reinforcing fins designated 29 and 30, respectively. The dimensions set forth above and other numerical values herein set forth are intended only by way of example and should not be taken as limiting the scope of the invention. Thus the cylinder 24 might, for example, be 300" long and 15' in diameter. Of course such a long length would necessitate some structural changes.

Figure 9:
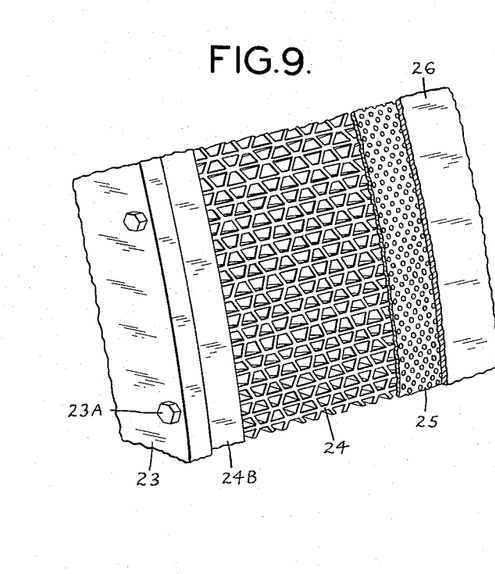
FIG. 9 is an enlarged perspective view of a small portion of the honeycomb, perforated metal and fiber metal cylinders of FIGS. 1 and 2.
Figure 10:
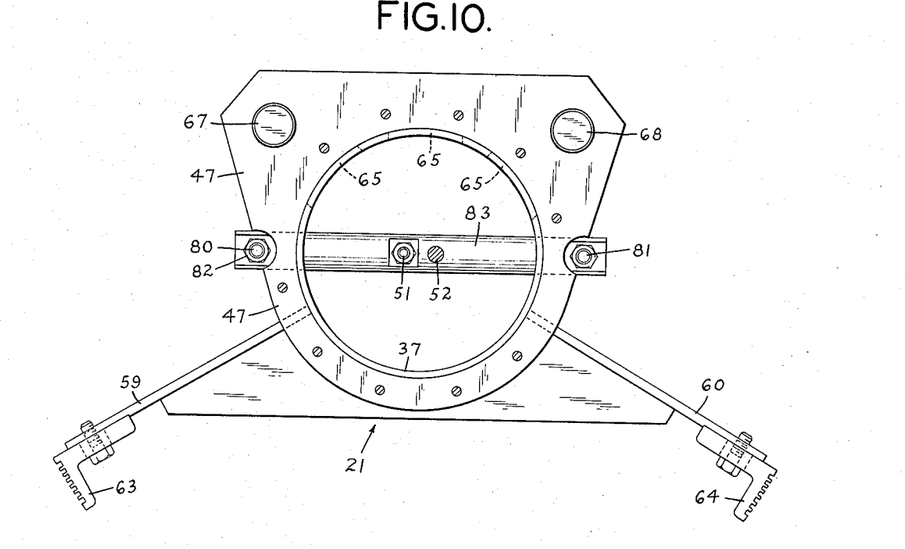
FIG. 10 is a right side elevational view of the air header pipe of FIGS. 1 and 2.
Figure 11:
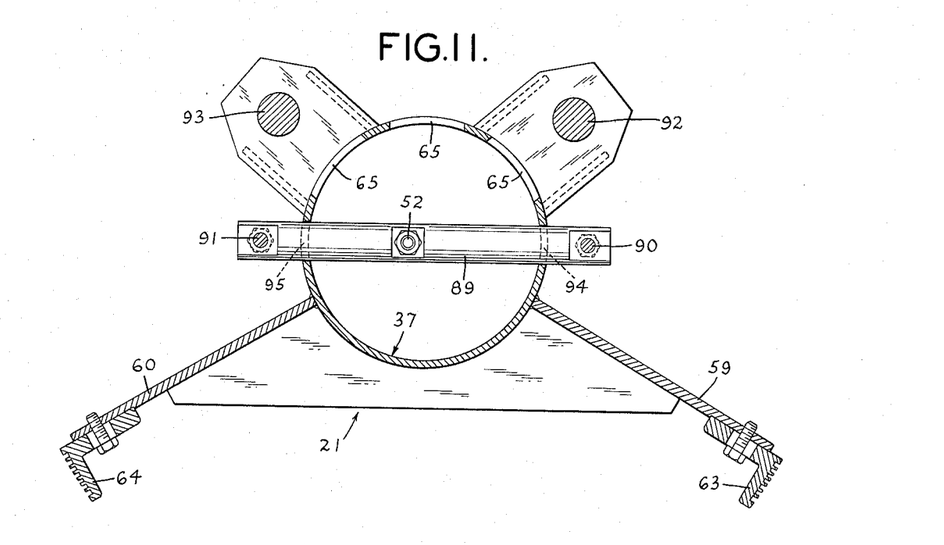
FIG. 11 is a cross-sectional view of the air header pipe taken along the line 11—11 of FIG. 1.

The cylinder 24 is preferably made in the form of a stainless steel grating having relatively large openings extending radially of the cylinder, as shown in FIG. 9. The respective ends of the honeycomb cylinder are welded to stainless steel rings 24A and 24B which rest in the notches 27 and 28, respectively, and are provided with peripherally spaced threaded holes which engage bolts 22A and 23A, which serve to attach the cylinder 24 rigidly to the disks 22 and 23.

The perforated metal cylinder 25 typically might be 0.0625" thick stainless steel and have a multiplicity of 1/8" diameter circular holes having their centers spaced about 3/16" apart to afford free passage of air. The cylinder 25 is wrapped closely around cylinder 24 and is coextensive with the latter.

The cylinder 26 is preferably made of a sintered fiber metal structure. Such a structure is a porous, bonded mat of randomly oriented, uniformly distributed metal fibers in which the individual fibers are joined and bonded to adjacent fibers at spaced points along the fiber where such fiber contacts adjacent fibers. The fiber metal structure might be made, for example, by the process described in the United States patent application of Walter C. Troy, Serial No. 492,007, now Patent No.

3,127,668, filed March 3, 1955. Other processes for the production of the fiber metal structure may also be used. Typically, the cylinder 26 might be 0.125" thick and be formed of stainless steel fiber metal having an apparent density of 52%. By apparent density is meant the ratio of volume of solid material to total volume expressed in terms of percent. An apparent density of 52% corresponds to a porosity of 48%. The material of cylinder 26 should have an apparent density lying in the range of about 40 to 60% for the purposes of the invention. An apparent density greater than about 60% will generally give too high a pressure drop for satisfactory results, while an apparent density of less than about 40% will result in too soft a fiber metal and which likely will be distorted in service. It is preferable that the fibers be relatively coarse, i.e., ½ to 1" long.

A wire screen may be sintered to the outer surface of the fiber metal cylinder 26 to prevent fuzzing. A typical screen for this purpose would be an 18 mesh screen made from 0.009" diameter 304 stainless steel wire. Cylinder 26 might also be made from a fine perforated metal or a tightly woven wire screen.

The cylinder 26 is wrapped closely around cylinder 25 and is coextensive therewith. The principal function of the cylinder 25 is to provide a structural base for attachment of the fiber metal cylinder to the honeycomb or other open faced cylinder 24. The perforated cylinder 25 distributes the load so as to relieve the physical strain on the fiber metal which is likely to occur if the fiber metal is directly attached to the honeycomb. Cylinder 25 also contributes added structural strength.

Figure 5:
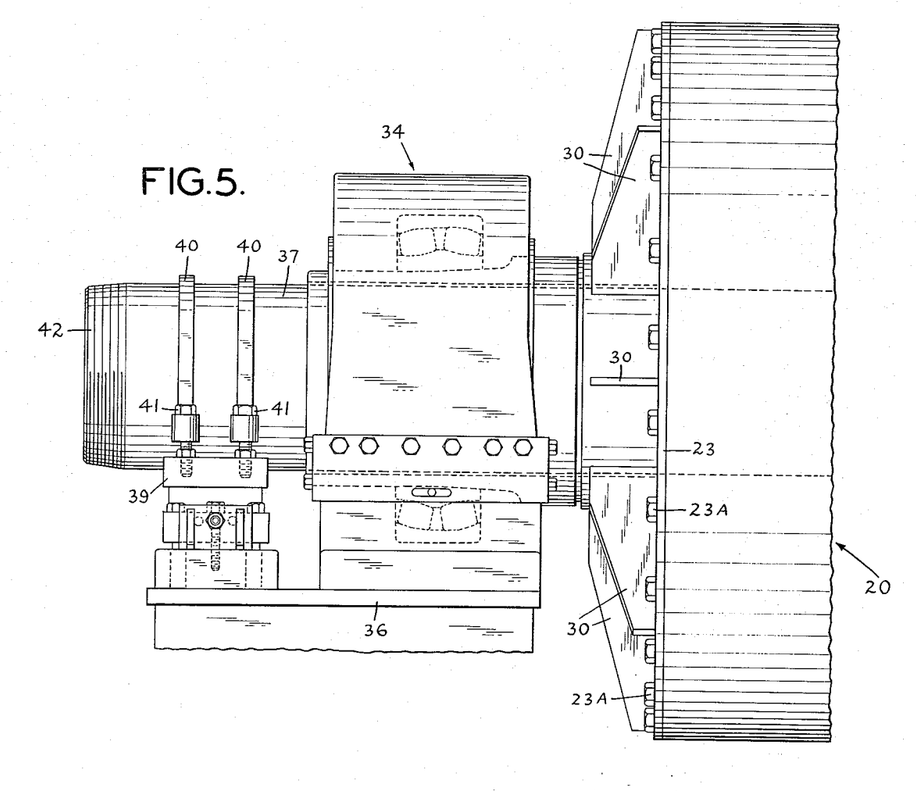
FIG. 5 is a side elevational view of the bearing end of that portion of the dryer shown in FIG. 1.
Figure 6:
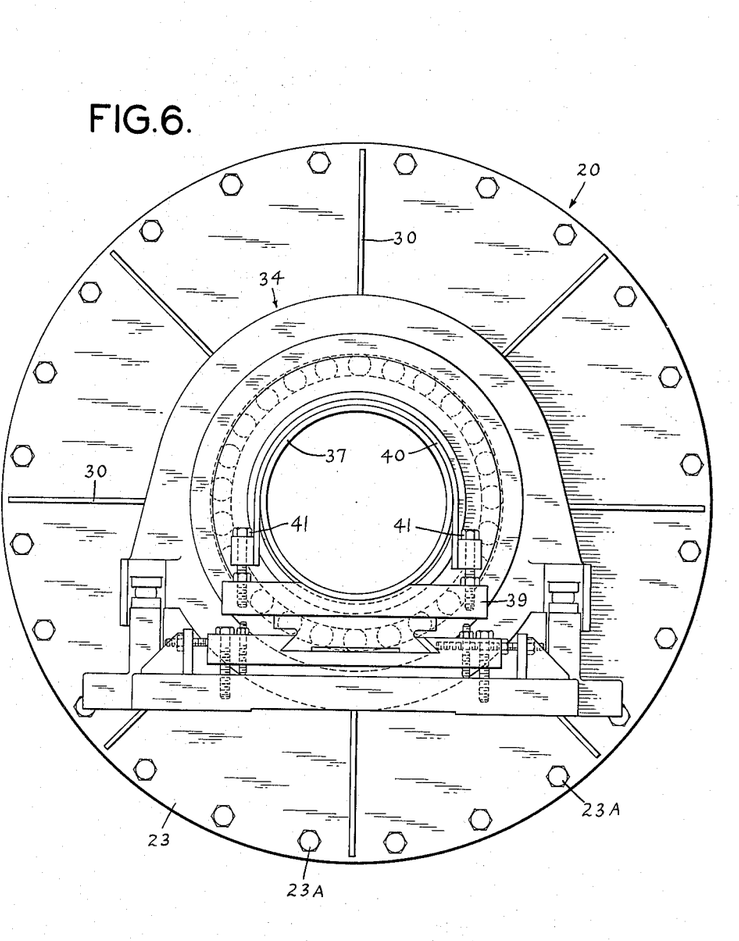
FIG. 6 is an end elevational view of that end of the dryer shown in FIG. 5.
Figure 7:
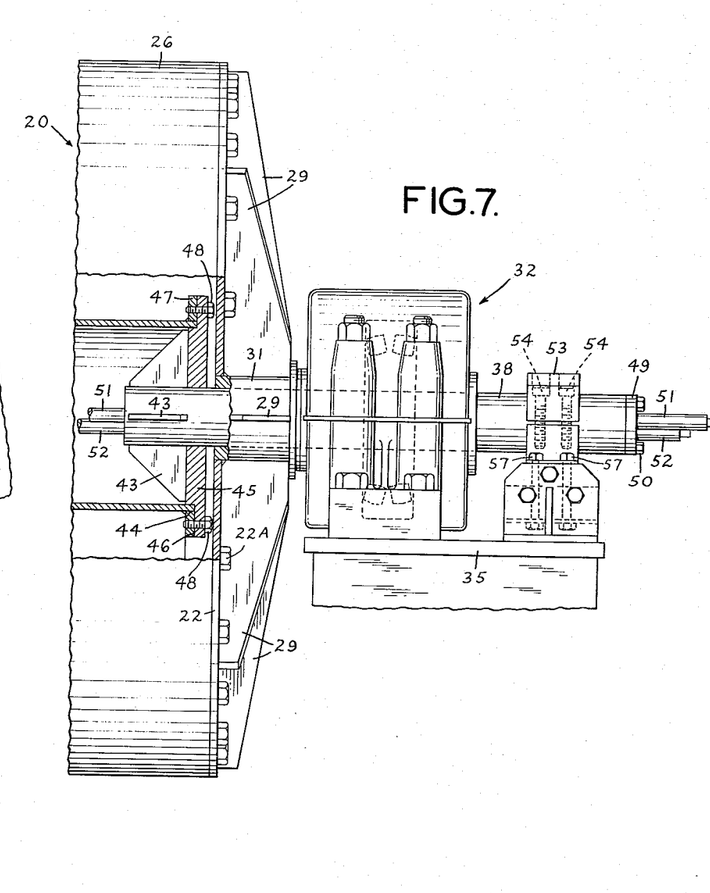
FIG. 7 is a side elevational view of the bearing end of that portion of the dryer shown in FIG. 2.
Figure 8:
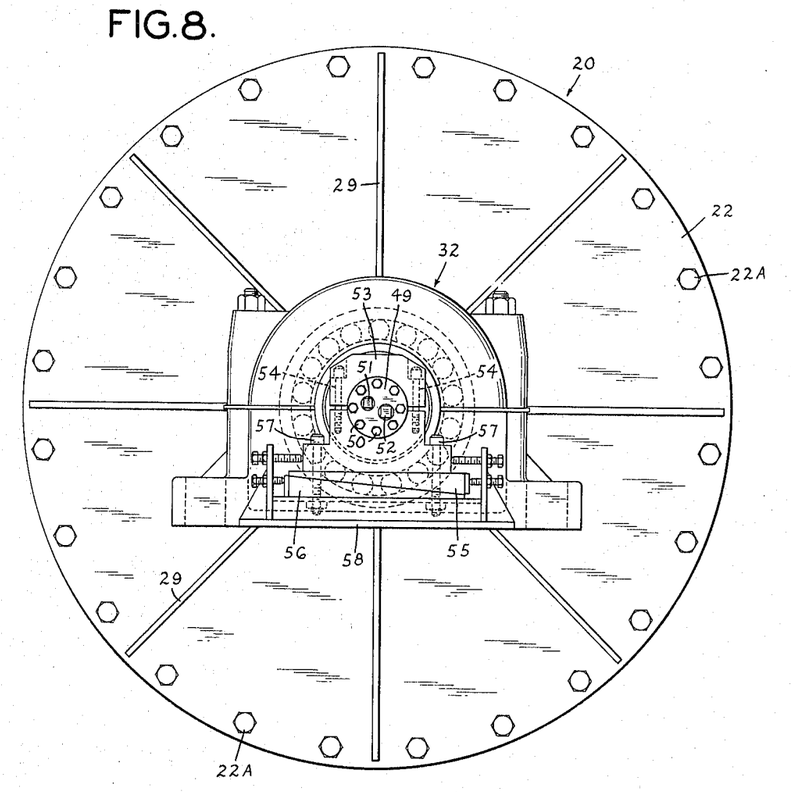
FIG. 8 is an end elevational view of that portion of the dryer shown in FIG. 7.

The disk 22 and fins 29 are fixedly attached, as by welding, to a hollow shaft 31 which is journaled for rotation in a roller bearing assembly 32 which may be of any suitable construction adapted to support the necessary weight. The disk 23 and fins 30 are similarly fixedly attached to a hollow shaft 33 which is journaled for rotation in a roller bearing assembly 34. The bearing assemblies 32 and 34 are supported on suitable frame members 35 and 36, respectively, shown diagrammatically in FIGS. 5 and 7, and which serve to support the dryer at any desired height above the floor.

The stationary assembly 21 comprises a hollow air header cylinder or pipe 37, which is supported at one end on a hollow trunnion 38 extending through the hollow shaft 31 into the space within cylinder 24. The other end of pipe 37 extends through the hollow shaft 33 and is supported on a bed plate 39 having an arcuate slot adapted to accommodate the bottom of pipe 37. The pipe 37 is held against rotation by straps 40, which are in turn bolted to plate 39 by bolts 41. The pipe 37 may be freed for rotation by loosening the bolts 41, thereby releasing the pipe 37 from the holding action of the straps 40. The end 42 of pipe 37 is tapered and threaded for attachment to a hot air conduit (not shown).

The trunnion 38 is provided with reinforcing fins 43, a circular flange 44, and another circular flange 45. The extreme end of pipe 38 is provided with a flange 47 forming a circular surface 46 against which the flange 45 is bolted by means of bolts 48.

The outer end of trunnion 38 is closed by a cover plate 49 which is attached to the end of trunnion 38 by bolts 50. Cover plate 49 is provided with holes which act as bearings to carry front and back deckle control rods 51 and 52, respectively. Trunnion 38 is supported and held against rotation, adjacent the outer end thereof, by a split collar 53 which is held together by bolts 54. The lower portion of collar 53 is supported on a pair of aligning wedges 55 and 56. The wedges 55 and 56 are provided with elongated slots to accommodate tightening bolts 57 which serve to attach the lower portion of collar 53 and wedges 55 and 56 to a base plate 58, which in turn is supported on the frame 35. The trunnion 38 may be freed for rotation with pipe 37 by releasing bolts 54 to free the split collar 53.

The air header pipe 37 is provided with two axially extending seal supporting side plates or arms 59 and 60 projecting radially from the outer surface of the pipe 37. In axial length, the side plates 59 and 60 extend almost the entire length of the honeycomb cylinder 24 to points axially outward of extreme outward positions 61' and 62' of axially movable deckle plates 61 and 62, respectively. The side plates 59 and 60 extend radially of the pipe 37 at a spacing of 120°

Figures 12, 13, 14:
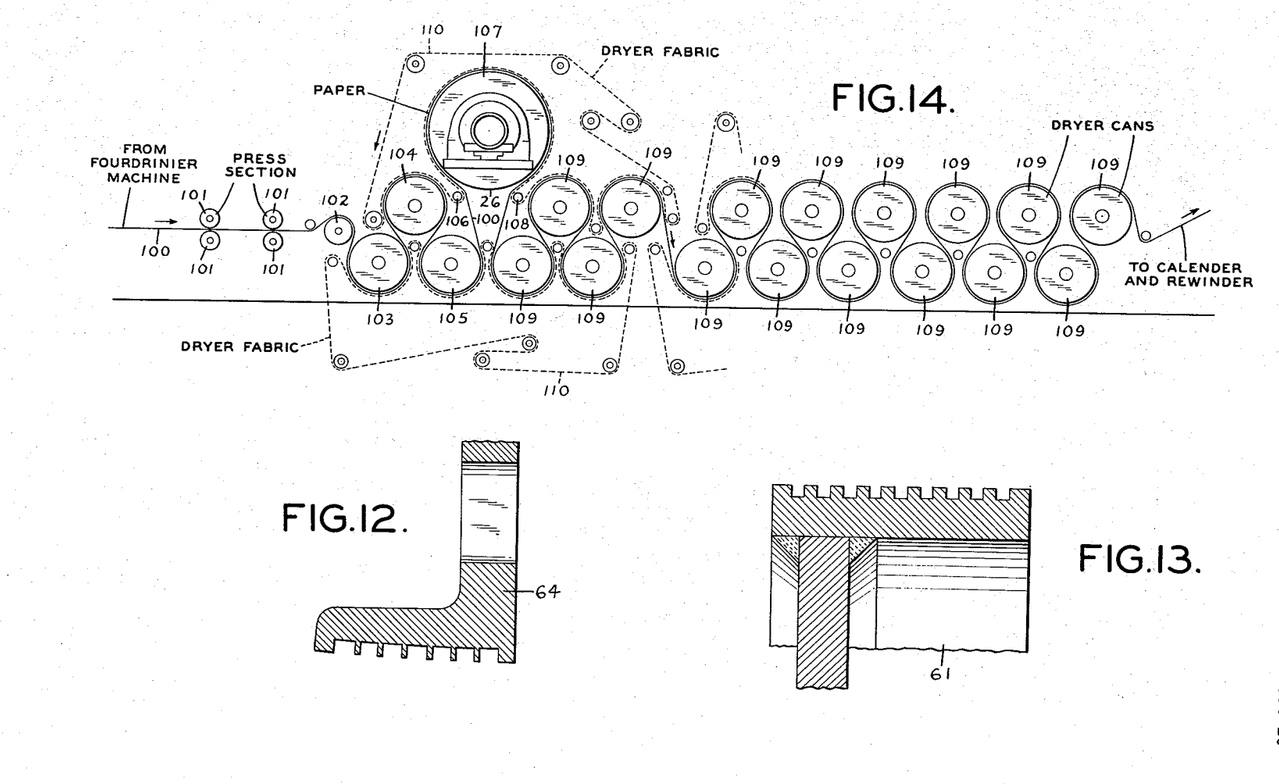
FIG. 12 is an enlarged sectional detail view of a sealing angle.
FIG. 13 is an enlarged sectional detail view of the peripheral edge of a deckle plate.
FIG. 14 is a schematic illustration of a typical installation of the dryer of the invention.

An elongated sealing angle 63 is bolted to side plate 59 adjacent the radially outer end thereof and a like sealing angle 64 is bolted to side plate 60 adjacent the radially outer end thereof. The sealing angles each have a sealing face which confronts the inner surface of honeycomb cylinder 24 and which is formed from a series of substantially rectangular teeth separated by substantially rectangular slots, as is best shown in FIG. 12. Typically, the sealing angle teeth might have a height of ⅛" and a thickness of 1/16", except for the two end teeth which are preferably somewhat thicker, e.g., ⅛". The slots separating the teeth typically might be ⅛" deep and have a width of 3/16". As shown in FIG. 12, there are eight teeth and seven slots. The sealing angle teeth are ground so that the sealing surface forms a segment of a cylindrical surface having a diameter slightly less than the internal diameter of the honeycomb cylinder 64. For example, if the honeycomb cylinder has an internal diameter of 44.125", the cylindrical surface in which the sealing angle teeth lie might have a diameter of 44.062". The clearance between the sealing angle teeth and the honeycomb cylinder internal surface is preferably as small as can conveniently be maintained and typically might be 0.031".

The air header pipe 37 is provided with a large number of circular holes 65 distributed evenly throughout the length thereof and along the 240° arc between arms 59 and 60. The holes 65 permit the free passage of air from within the pipe 37 to the space within cylinder 24 between side plates 59 and 60 (along the long arc). The side plates 59 and 60 and the sealing angles 63 and 64 effectively prevent air from passing into the space within cylinder 24 along the short arc between side plates 59 and 60. The space into which air flows from air header pipe 37 is designated 66.

The space 66 is axially limited at the respective ends thereof by deckle plates 61 and 62. The deckle plates 61 and 62 are narrow disks each extending over an arc of 240° from side plate 59 to side plate 60. The plates 61 and 62 are shaped to act as closures for each end of space 66. For this purpose the plates 61 and 62 are shaped as cylindrical segments with peripheral edges formed from a series of rectangular or square teeth separated by rectangular or square slots, as best shown in FIG. 13. Typically, the teeth of the plates 61 and 62 might be ⅛" high and ⅛" wide, except for the end teeth which may be somewhat wider, e.g., 3/16". The slots might likewise be ⅛" deep by ⅛" wide. The spacing between the peripheral surface of the teeth of the plates 61 and 62 and the inner surface of the honeycomb cylinder is preferably as small as possible and might be, for example, 0.031".

The deckle plates 61 and 62 are individually shiftable in an axial direction to permit adjustment of the axial length of the space 66. The maximum outer and inner positions of the deckle plates 61 and 62 are shown in dotted lines at 61', 62' and 61", 62", respectively.

Figure 1:
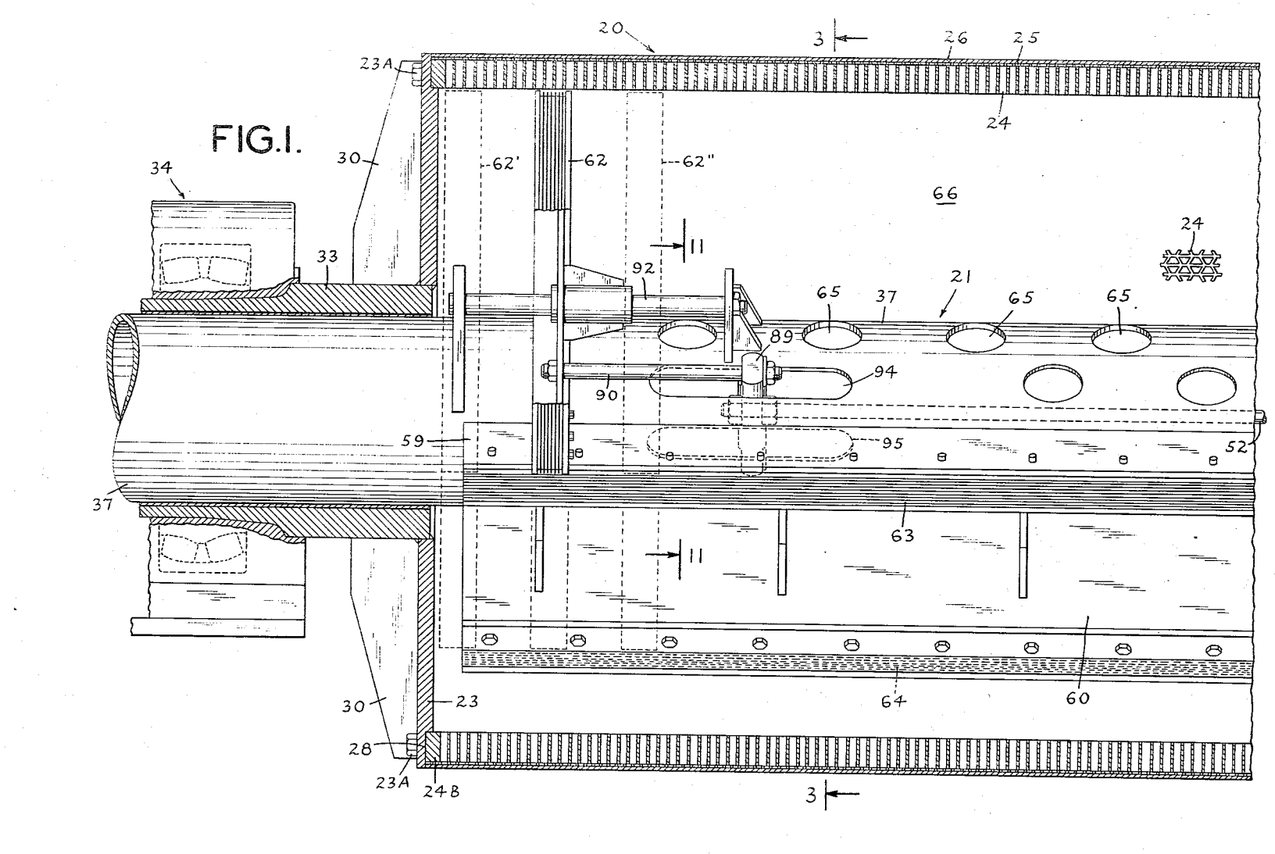
FIGS. 1 and 2, when joined from left to right, form a longitudinal sectional view of an illustrative embodiment of the dryer of the invention.
Figure 2:
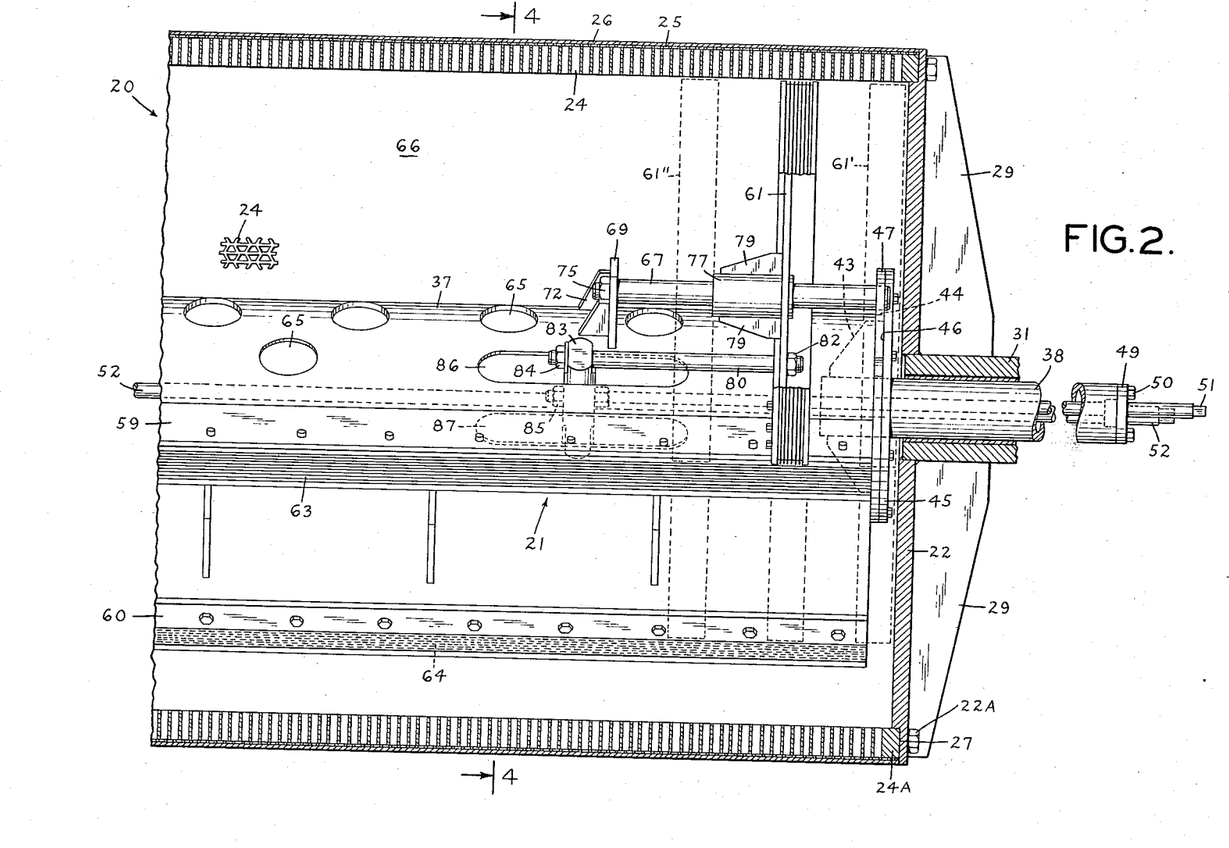
Figure 3:
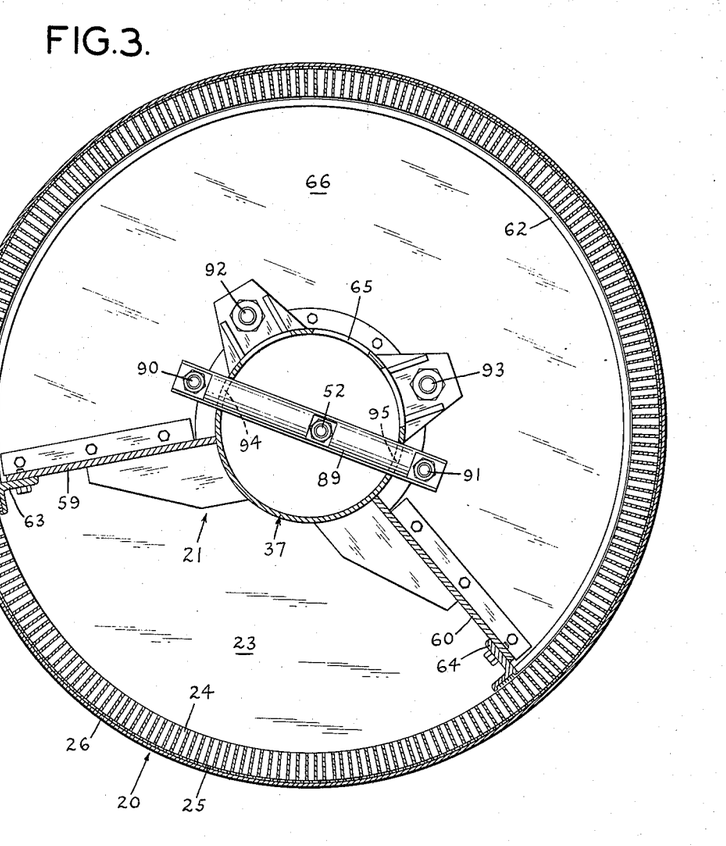
FIG. 3 is a cross-sectional view taken along the line 3—3 of FIG. 1.

The plate 61 is slidably mounted on spaced parallel guide bars 67 and 68 which extend axially of the pipe 37 and are supported at one end thereof in holes provided in flange 47 and at the other end thereof in holes provided in radially extending flanges 69 and 70, respectively. The flanges 69 and 70 project from the surface of pipe 37 and are reinforced by fins 71, 72 and 73, 74, respectively. The ends of the guide bars 67 and 68 which pass through holes in the flanges 69 and 70 are of reduced diameter affording shoulders abutting against the flanges 69 and 70 to prevent motion of the guide bars toward the left (FIG. 2). The reduced diameter ends of the guide bars 67 and 68 are threaded and carry nuts 75 and 76 which prevent motion of the guide bars 67 and 68 toward the right (FIG. 2).

The plate 61 is provided with elongated bushings or sleeves 77 and 78 which ride on guide bars 67 and 68, respectively, and prevent tipping of the plate 61. The bushings are slidable on the guide bars to permit axial movement of the plate 61. Reinforcing fins 79 assist in supporting the deckle plate 61 on the bushings 77 and 78.

A pair of connecting rods 80 and 81 are provided for transferring motive force to the plate 61. The ends of the rods 80 and 81 are of reduced diameter and are threaded, one end of each extending through a hole in plate 61 and being affixed in position by a nut. The nut 82 which holds the rod 80 is shown in FIG. 2. Inwardly of the nut 82 and the corresponding nut for rod 81 the rods have shoulders which abut against the inner side of the plate 61. The other ends of the rods 80 and 81 extend through holes provided in respective ends of a joining bar 83, the ends of the rods 80 and 81 carrying nuts 84 and 85, respectively. Outwardly of the nuts 84 and 85 (to the right in FIG. 2) the rods 80 and 81 have shoulders which abut against bar 83, preventing relative axial movement of the rods 80 and 81 and the bar 83.

The connecting bar 83 extends through axially elongated holes 86 and 87 in pipe 37 which are sufficiently long to permit bar 83 to move axially through the same distance as the deckle plate 61. Adjacent the center of bar 83 there is provided a hole which accommodates the inner end of adjusting rod 51. Rod 51 has a threaded reduced diameter end affording a shoulder abutting against the inner side of bar 83. The rod 51 is secured to the outer side of bar 83 by a nut 88. The bar 83 is provided with another hole which accommodates adjusting rod 52. This hole should be of sufficient size that motion of rod 52 will not result in motion of bar 83.

As the adjusting rod 51 is moved in an axial direction, as by manual force exerted thereon, the bar 83 and rods 80 and 81 impart a like axial motion to deckle plate 61, causing the latter to slide along guide bars 67 and 68.

Axial motion of adjusting rod 52 produces axial motion of deckle plate 62 through a similar linkage comprising a joining bar 89 and connecting rods 90 and 91. The plate 62 is similarly supported on guide bars 92 and 93. The joining bar 89 acts in axially elongated slots 94 and 95 in pipe 37.

Figure 4:
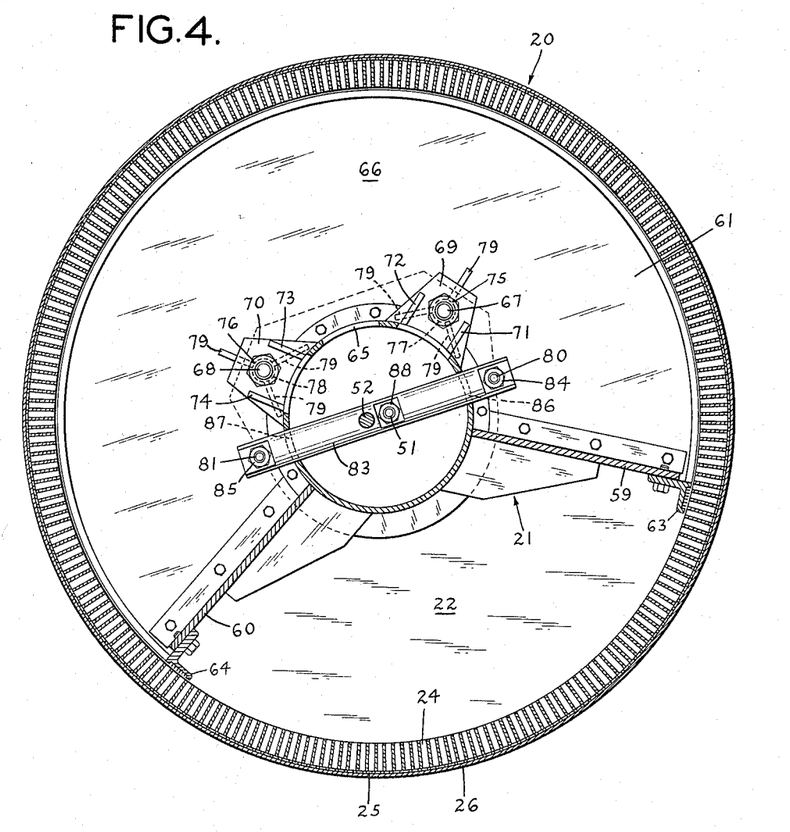
FIG. 4 is a cross-sectional view taken along the line 4—4 of FIG. 2.

A typical installation of the dryer is illustrated in FIG. 14. In this figure the reference numeral 100 designates the paper web output of a Fourdrinier machine (not shown) which passes between conventional press rolls 101, over a steam heated baby dryer 102 and thence around conventional steam heated dryer rolls or cans 103, 104 and 105. The paper leaving the dryer can 105 contacts a guide roll 106 and then passes around dryer roll 107 which embodies the invention and may be constructed as shown in FIGS. 1–13 and as described hereinbefore. The paper web 100 contacts the roll 107 over an arc slightly greater than the long arc between the arms 59 and 60 (FIGS. 2 and 4). Typically, the paper web might contact the roll 107 over an arc of about 250°. The paper web 100 leaving roll 107 contacts a guide roll 108 and then passes around a series of conventional steam heater dryer cans 109. The paper web leaving the last dryer can may be passed to conventional calender and rewinder stands (not shown).

During the drying operation, the paper web 100 is held in tight contact with the dryer cans and with the dryer roll 107 by suitable runs of dryer fabric arranged in endless strips as its customary. The run of dryer fabric which holds the web in contact with dryer roll 107 is designated 110 and may be made of any suitable porous fabric which affords relatively free passage of air, as will be described below. An excellent material for the dryer fabric 110 is the Fourdrinier cloth described and claimed in United States Patent 2,903,021 to Holden and Schiff, granted September 8, 1959. The dryer fabric 110 holds the wet paper tightly against the fiber metal cylinder 26 forming the outer surface of roll 107. The dryer fabric 110 is suitably powered to advance the paper web 100 and to rotate the roll 107 and the dryer cans. As the dryer fabric 110 and paper web 100 advance, the dryer roll 107 is rotated. It will be recalled, however, that the side plates 59 and 60, the air header pipe 37, the deckle plates 62 and 63 and associated parts remain stationary as the honeycomb cylinder 24, perforated cylinder 25 and fiber metal cylinder 26 are rotated. Hence the air chamber 66 remains stationary as the paper is advanced.

Heated air supplied under superatmospheric pressure to the left end of air header 37 (FIG. 1) passes through holes 65 into space 66 and from space 66 successively through honeycomb cylinder 24, perforated cylinder 25, fiber metal cylinder 26, paper web 100 and dryer fabric 110. The pressure drop across the honeycomb cylinder 24, perforated cylinder 25 and dryer fabric 110 is negligible. About $\frac{1}{10}$ to $\frac{1}{20}$ of the pressure drop will occur across the fiber metal cylinder 26, and the balance across the paper. The heated air passing through the paper web entrains moisture therefrom and carries the moisture through the dryer fabric 110 into the surrounding atmosphere. Preferably, a suitable hood is provided to withdraw the moisture-laden air from the vicinity of the dryer roll 107.

The heated air in the space 66 is prevented from leaving the space 66 except by passing through the paper web by the seals afforded by sealing angles 63 and 64 and by the peripheral edges of deckle plates 61 and 62. The axial locations of the plates 61 and 62 should be adjusted so that the side edges of the paper web 100 overlie the inner edges of the plates 61 and 62. Heated air lost in the small clearance spaces between the sealing angles 63 and 64 and the honeycomb cylinder 24 and between the deckle plates and the honeycomb cylinder 24 will be negligible.

In FIG. 14 there are shown nineteen dryer cans and one dryer roll constructed in accordance with the invention. It should be understood, however, that more dryer rolls according to the invention may be used and the locations of the dryer rolls (or of a single dryer roll) may be selected at will with respect to the drying operation. In general, it has been found that the dryer roll of the invention will replace, i.e., perform the drying function of, approximately five conventional steam heated dryer cans of the same outside diameter.

The temperature of the heated air supplied to the dryer roll 107 is preferably as high as can be accommodated without causing damage to the paper web. For example, where the dryer roll 107 is installed in that portion of the drying operation usually termed the constant rate period (in which evaporation is largely independent of moisture content), the air temperature preferably lies in the range of about 400–600° F. But, where the dryer roll 107 is installed in that portion of the drying operation usually termed the falling rate period, the air temperature preferably lies in the range of about 200–300° F.

The paper web which can most effectively be handled by the dryer of the invention is relatively porous so as to be able to permit passage of the heated air therethrough. The dryer of the invention is particularly useful in drying kraft paper, filter paper, toweling and open board corrugated stock.

A number of typical examples will now be given for a dryer roll having essentially the construction described above. The following examples are for a paper web in the constant rate period. With an air temperature of 600° F. (in header pipe 37), an air flow of 50 s.c.f.m.

yielded a drying rate (evaporated water) of 25 pounds per hour per square foot. By "s.c.f.m." is meant standard cubic feet per minute per square foot, and it is the volume of flow corrected to 14.7 p.s.i. and 70° F. The "square foot" referred to is the surface area of the fiber metal cylinder segment through which air passes into the paper web. With an air temperature of 500° F. and an air flow of 50 s.c.f.m., the drying rate was 20 pounds per hour per square foot. With an air temperature of 500° F. and an air flow of 40 s.c.f.m., the drying rate was 16 pounds per hour per square foot. With an air temperature of 300° F. and an air flow of 50 s.c.f.m., the drying rate was 10 pounds per hour per square foot.

The following examples are for a paper web in the falling rate period. For a paper web having 20% moisture content (by weight), an air temperature of 300° F. and an air flow of 50 s.c.f.m. yielded a drying rate of 8 pounds per hour per square foot. For a paper web having a 20% moisture content, an air temperature of 200° F. and an air flow of 40 s.c.f.m. yielded a drying rate of 4 pounds per hour per square foot. For a paper web having a 10% moisture content, an air temperature of 300° F. and an air flow of 40 s.c.f.m. yielded a drying rate of 4 pounds per hour per square foot.

The air pressure in the space 66 to produce the indicated flow rates will vary, of course, with the density of the paper web but typically will lie in the range of about ½ to 1½ p.s.i.g. The openings in the honeycomb cylinder 24 and in perforated cylinder 25 should be sufficiently large and closely spaced that the pressure drop thereacross will be negligible. The pressure drop across the fiber metal cylinder 26 is preferably about 1/10 to 1/20 of the total pressure drop. For this purpose, the apparent density of the fiber metal is preferably in the range of about 60 to 40%.

While the invention has been described in connection with a specific embodiment thereof and in a specific use, various modifications thereof will occur to those skilled in the art without departing from the spirit and scope of the invention as set forth in the appended claims.

What is claimed is:

1. A dryer for the wet paper web output of a papermaking machine and the like, comprising:
   (a) a hollow honeycomb cylinder having a multiplicity of closely spaced relatively large openings in the surface thereof affording a free passage of air therethrough;
   (b) means to support said hollow cylinder for rotation;
   (c) stationary supporting means in said cylinder;
   (d) axially and radially extending sealing means mounted in said cylinder on said supporting means and defining an axially enclosed portion of the space within said hollow cylinder, said axially enclosed portion having a peripheral extent equal to a major portion of the circumference of said hollow cylinder;
   (e) a pair of sealing elements mounted in said cylinder on said supporting means and arranged to form end closures at opposite ends of said axially enclosed portion;
   (f) means to admit a substantial volume of heated air at a superatmospheric pressure to said axially enclosed portion, said sealing means and said sealing elements being arranged effectively to prevent said heated air from leaving said axially enclosed space except through said openings in said hollow cylinder;
   (g) a thin perforated metal cylinder overlying and covering the outer surface of said hollow cylinder and being rigidly connected thereto, the perforations in said metal cylinder having sufficient cross-sectional area and being sufficiently numerous to afford free passage of air through all parts of the surface of said hollow cylinder;
   (h) a thin sintered fiber metal cylinder overlying and covering the outer surface of said perforated metal cylinder and being rigidly connected thereto, said fiber metal cylinder having an apparent density lying in the range of about 40 to 60%;
   (i) individual means to adjust the axial locations of said sealing elements to thereby adjust the axial extent of said axially enclosed space;
   (j) an endless length of porous dryer fabric; and
   (k) means to direct said dryer fabric into a path about said fiber metal cylinder over an arc slightly greater than and including the peripheral extent of said axially enclosed space, said dryer fabric being arranged to press a web of wet paper stock into tight contact with said fiber metal cylinder over said arc, the porosity of said dryer fabric being sufficient that the pressure drop experienced by said heated air in passing therethrough will be negligible as compared to the pressure drop across said fiber metal cylinder and said wet paper web.

2. A dryer for the wet paper web output of a papermaking machine and the like, comprising:
   (a) a hollow honeycomb cylinder having a multiplicity of closely spaced relatively large openings in the surface thereof affording a free passage of air therethrough;
   (b) means to support said hollow cylinder for rotation;
   (c) stationary supporting means in said cylinder;
   (d) axially and radially extending sealing means mounted in said cylinder on said supporting means and defining an axially enclosed portion of the space within said hollow cylinder, said axially enclosed portion having a peripheral extent equal to a major portion of the circumference of said hollow cylinder;
   (e) a pair of sealing elements mounted in said cylinder on said supporting means and arranged to form end closures at opposite ends of said axially enclosed portion;
   (f) means to admit a substantial volume of heated air at a superatmospheric pressure to said axially enclosed portion, said sealing means and said sealing elements being arranged effectively to prevent said heated air from leaving said axially enclosed space except through said openings in said hollow cylinder;
   (g) a thin perforated metal cylinder overlying and covering the outer surface of said hollow cylinder and being rigidly connected thereto, the perforations in said metal cylinder having sufficient cross-sectional area and being sufficiently numerous to afford free passage of air through all parts of the surface of said hollow cylinder;
   (h) a thin sintered fiber metal cylinder overlying and covering the outer surface of said perforated metal cylinder and being rigidly connected thereto, said fiber metal cylinder having an apparent density lying in the range of about 40 to 60%; and
   (i) individual means to adjust the axial locations of said sealing elements to thereby adjust the axial extent of said axially enclosed space.

3. A dryer for the wet paper web output of a papermaking machine and the like, comprising:
   (a) a hollow cylinder having a multiplicity of closely spaced relatively large openings in the surface thereof affording a free passage of air therethrough;
   (b) means to support said hollow cylinder for rotation;
   (c) stationary supporting means in said cylinder;
   (d) axially and radially extending sealing means mounted in said cylinder on said supporting means and defining an axially enclosed portion of the space within said hollow cylinder, said axially enclosed portion having a peripheral extent equal to a major portion of the circumference of said hollow cylinder;
   (e) a pair of sealing elements mounted in said cylinder on said supporting means and arranged to form end closures at opposite ends of said axially enclosed portion;
   (f) means to admit a substantial volume of heated air at a superatmospheric pressure to said axially enclosed portion, said sealing means and said sealing elements being arranged effectively to prevent said heated air from leaving said axially enclosed space except through said openings in said hollow cylinder;
(g) a thin perforated metal cylinder overlying and covering the outer surface of said hollow cylinder and being rigidly connected thereto, the perforations in said metal cylinder having sufficient cross-sectional area and being sufficiently numerous to afford free passage of air through all parts of the surface of said hollow cylinder; and
(h) a thin sintered fiber metal cylinder overlying and covering the outer surface of said perforated metal cylinder and being rigidly connected thereto, said fiber metal cylinder having an apparent density lying in the range of about 40 to 60%.

4. A dryer for the wet paper web output of a papermaking machine and the like, comprising:
(a) a hollow cylinder having a multiplicity of closely spaced openings in the surface thereof affording a free passage of air therethrough;
(b) means to support said hollow cylinder for rotation;
(c) stationary supporting means in said cylinder;
(d) axially and radially extending sealing means mounted in said cylinder on said supporting means and defining an axially enclosed portion of the space within said hollow cylinder, said axially enclosed portion having a peripheral extent equal to a major portion of the circumference of said hollow cylinder;
(e) a pair of sealing elements mounted in said cylinder on said supporting means and arranged to form end closures at opposite ends of said axially enclosed portion;
(f) means to admit a substantial volume of heated air at a superatmospheric pressure to said axially enclosed portion, said sealing means and said sealing elements being arranged effectively to prevent said heated air from leaving said axially enclosed space except through said openings in said hollow cylinder; and
(g) a thin porous sintered fiber metal cylinder overlying and covering the outer surface of said hollow cylinder and being rigidly connected thereto.

5. A dryer for the wet paper web output of a papermaking machine and the like, comprising:
(a) a hollow cylinder having a multiplicity of closely spaced openings in the surface thereof affording a free passage of air therethrough;
(b) means to support said hollow cylinder for rotation;
(c) stationary supporting means in said cylinder;
(d) axially and radially extending sealing means mounted in said cylinder on said supporting means and defining an axially enclosed portion of the space within said hollow cylinder, said axially enclosed portion having a peripheral extent equal to a major portion of the circumference of said hollow cylinder;
(e) a pair of sealing elements mounted in said cylinder on said supporting means and arranged to form end closures at opposite ends of said axially enclosed portion;
(f) means to admit a substantial volume of heated air at a superatmospheric pressure to said axially enclosed portion, said sealing means and said sealing elements being arranged effectively to prevent said heated air from leaving said axially enclosed space except through said openings in said hollow cylinder;
(g) a thin porous metallic sheet overlying and covering the outer surface of said hollow cylinder and being arranged to rotate therewith;
(h) an endless length of porous dryer fabric; and
(i) means to direct said dryer fabric into a path about said hollow cylinder over an arc slightly greater than and including the peripheral extent of said axially enclosed space, said dryer fabric being arranged to press a web of wet paper stock into tight contact with said sheet over said arc, the porosity of said dryer fabric being sufficient that the pressure drop experienced by said heated air in passing therethrough will be negligible as compared to the pressure drop across said sheet and said wet paper web, said sheet having a porosity selected so that the pressure drop experienced by said heated air in passing therethrough will be about $\frac{1}{10}$ to $\frac{1}{20}$ of the total pressure drop across said sheet and said wet paper web.

6. A dryer for the wet paper web output of a papermaking machine and the like, comprising:
(a) a hollow honeycomb cylinder having a multiplicity of closely spaced relatively large openings in the surface thereof affording a free passage of air therethrough;
(b) means to support said hollow cylinder for rotation;
(c) stationary supporting means in said cylinder;
(d) axially and radially extending sealing means mounted in said cylinder on said supporting means and defining an axially enclosed portion of the space within said hollow cylinder, said axially enclosed portion having a peripheral extent equal to a major portion of the circumference of said hollow cylinder;
(e) a pair of sealing elements mounted in said cylinder on said supporting means and arranged to form end closures at opposite ends of said axially enclosed portion;
(f) means to admit a substantial volume of heated air at a superatmospheric pressure to said axially enclosed portion, said sealing means and said sealing elements being arranged effectively to prevent said heated air from leaving said axially enclosed space except through said openings in said hollow cylinder;
(g) a thin sintered fiber metal cylinder overlying and covering the outer surface of said hollow cylinder and being rigidly coupled to said hollow cylinder in rotation therewith, said fiber metal cylinder having an apparent density lying in the range of about 40 to 60%;
(h) an endless length of porous dryer fabric; and
(i) means to direct said dryer fabric into a path about said fiber metal cylinder over an arc slightly greater than and including the peripheral extent of said axially enclosed space, said dryer fabric being arranged to press a web of wet paper stock into tight contact with said fiber metal cylinder over said arc, the porosity of said dryer fabric being sufficient that the pressure drop experienced by said heated air in passing therethrough will be negligible as compared to the pressure drop across said fiber metal cylinder and said wet paper web.

7. A dryer for the wet paper web output of a papermaking machine and the like, comprising:
(a) a hollow honeycomb cylinder having a multiplicity of relatively large closely spaced openings in the surface thereof affording a free passage of air therethrough;
(b) first and second axially aligned hollow shafts;
(c) first and second bearing means each supporting a respective one of said first and second shafts for rotation;
(d) means mounted on said first and second shafts for supporting said honeycomb cylinder for rotation with said first and second shafts;
(e) a hollow pipe disposed within and coaxial with said honeycomb cylinder and extending substantially through the length of the latter, said pipe having openings arranged to admit air from within said pipe to the interior of said hollow cylinder along an intermediate portion of the length of said pipe, said openings in said pipe being arranged to admit said air to the interior of said hollow cylinder over a selected major portion of the periphery of said pipe;

(f) third and fourth hollow shafts each extending through one of said first and second hollow shafts and being coupled to respective ends of said pipe for supporting the latter, said third and fourth hollow shafts extending axially outwardly beyond the ends of said respective first and second shafts, said fourth hollow shaft forming an extension of said pipe and being arranged to carry substantial volumes of heated air at a super-atmospheric pressure from an external source to said pipe;

(g) first and second supporting means each supporting a respective one of said third and fourth hollow shafts and being arranged to hold the latter against rotation;

(h) a thin porous sintered fiber metal cylinder overlying and covering the outer surface of said hollow cylinder;

(i) a pair of arms extending radially from the surface of said pipe at points beyond said selected major portion of the periphery of said pipe, said arms having an axial extent greater than and including said intermediate portion of the length of said pipe;

(j) sealing means mounted on each of said arms and along the length thereof and extending radially substantially to the internal periphery of said honeycomb cylinder, said sealing means and said arms defining an axially enclosed portion of the annular space within said honeycomb cylinder substantially equal in peripheral extent to said selected major portion of the periphery of said pipe;

(k) a pair of deckle plates, said deckle plates each having a sealing configuration along the outer peripheral surface thereof and having peripheral and radial extents sufficient to form end closures for said axially enclosed portion of said annular space; and (l) means to mount each of said deckle plates on said pipe approximately at respective opposite ends of said intermediate portion of the length of said pipe, said mounting means supporting said deckle plates in position to close the ends of said axially enclosed portion.

8. A dryer for the wet paper web output of a papermaking machine and the like, comprising:

(a) a hollow honeycomb cylinder having a multiplicity of relatively large closely spaced openings affording a free passage of air therethrough;

(b) first and second axially aligned hollow shafts;

(c) first and second bearing means each supporting a respective one of said first and second shafts for rotation;

(d) a pair of disk elements each closing a respective end of said honeycomb cylinder and being mounted on a respective one of said first and second shafts for supporting said honeycomb cylinder for rotation with said first and second shafts;

(e) a hollow pipe disposed within and coaxial with said honeycomb cylinder and extending substantially through the length of the latter, said pipe having a multiplicity of openings distributed along an intermediate portion of the length of said pipe and having an axial extent constituting a major portion of the axial length of said honeycomb cylinder, said openings in said pipe being distributed over a selected major portion of the periphery of said pipe;

(f) third and fourth hollow shafts each extending through one of said first and second hollow shafts and being coupled to respective ends of said pipe for supporting the latter, said third and fourth hollow shafts extending axially outwardly beyond the ends of said respective first and second shafts, said fourth hollow shaft forming an extension of said pipe and being arranged to carry substantial volumes of heated air at superatmospheric pressure from an external source to said pipe;

(g) first and second supporting means each supporting a respective one of said third and fourth hollow shafts and being arranged to hold the latter against rotation;

(h) a thin perforated metal cylinder overlying and covering the outer surface of said honeycomb cylinder and being rigidly connected to the latter, the perforations in said metal cylinder having sufficient cross-sectional area and being sufficiently numerous to afford free passage of air through all parts of the surface of said honeycomb cylinder;

(i) a thin sintered fiber metal cylinder overlying and covering the outer surface of said perforated metal cylinder and being rigidly connected to the latter, said fiber metal cylinder having an apparent density lying in the range of about 40 to 60%;

(j) a pair of arms extending radially from the surface of said pipe at points beyond said selected major portion of the periphery of said pipe, said arms having an axial extent greater than and including said intermediate portion of the length of said pipe;

(k) sealing means mounted on each of said arms and along the length thereof and extending radially substantially to the internal periphery of said honeycomb cylinder, said sealing means and said arms defining an axially enclosed portion of the annular space within said honeycomb cylinder substantially equal in peripheral extent to said selected major portion of the periphery of said pipe;

(l) a pair of deckle plates, said deckle plates each having a sealing configuration along the outer peripheral surface thereof and having peripheral and radial extents sufficient to form end closures for said axially enclosed portion of said annular space;

(m) first and second bracket means to mount each of said deckle plates on said pipe approximately at respective opposite ends of said intermediate portion of the length of said pipe, said bracket means supporting said deckle plates in position to close the ends of said axially enclosed portion and being adjustable to vary individually the axial positions of said deckle plates thereby to permit adjustment of the axial length of said axially enclosed portions; and (n) first and second control rods extending through said third hollow shaft and being coupled at the inner ends thereof to said respective first and second bracket means, said control rods being individually axially movable to adjust the axial locations of the corresponding deckle plates.

9. A dryer as set forth in claim 8, comprising:

(o) an endless length of porous dryer fabric; and (p) means to direct said dryer fabric into a path about said fiber metal cylinder over an arc slightly greater than and including the periphery of said axially enclosed portion of the annular space within said honeycomb cylinder, said dryer fabric being arranged to press a web of wet paper stock into tight contact with said fiber metal cylinder over said arc, the porosity of said dryer fabric being sufficient that the pressure drop experienced by said heated air in passing therethrough will be negligible as compared to the pressure drop across said fiber metal cylinder and said wet paper web.

10. A dryer as set forth in claim 8 in which said sealing means mounted on said arms and said sealing configuration along the outer peripheral surfaces of said deckle plates are formed from a series of narrow teeth separated by slots, said teeth being closely spaced with respect to the internal surface of said honeycomb cylinder to effectively prevent air from leaving said axially enclosed space except through the surface of said honeycomb cylinder bounding said axially enclosed space.

11. A dryer as set forth in claim 8 in which said selected major portion of the periphery of said pipe is at least about 240°.

12. A dryer as set forth in claim 8 in which said first and second supporting means are releasable to permit adjustment of the angular location of said axially enclosed space.

References Cited by the Examiner

UNITED STATES PATENTS

| | | | |
|---|---|---|---|
| 2,303,123 | 11/1942 | Johannessen | 34—115 X |
| 3,073,038 | 1/1963 | Dapses | 34—41 X |

WILLIAM F. O'DEA, *Primary Examiner.*

A. D. HERRMANN, *Assistant Examiner.*